United States Patent Office 3,746,711
Patented July 17, 1973

3,746,711
PREPARATION OF PYRAZINE DERIVATIVES
Laurence Sydney Payne, Ashford, Peter Ward, Aldington, near Ashford, and Reginald David Wells, Sellindge, near Ashford, England, assignors to Lever Brothers Company, New York, N.Y.
No Drawing. Filed Dec. 14, 1970, Ser. No. 98,176
Int. Cl. C07d 51/76
U.S. Cl. 260—250 R     5 Claims

ABSTRACT OF THE DISCLOSURE

A process for the preparation of various nuclear substituted pyrazines comprises reacting pyrazine, a $C_1$–$C_{10}$ alkyl pyrazine, a $C_1$–$C_5$ alkoxy pyrazine or an aminopyrazine with an alkylating agent in the optional presence of an inert solvent. The alkylating agent can be a ketone, an aldehyde or imino derivative thereof or an alkyl-, cycloalkyl- or arylhalide. The source of "free" electrons is preferably either lithium, sodium or potassium. The nuclear substituted pyrazines obtained possess strong characteristic odours. Certain of these compounds are of value as flavouring agents while others are of use in imparting characteristic notes to perfume formulations.

---

This invention relates to a process for the preparation of certain compounds of value as perfumery or flavouring ingredients. The invention relates, in particular, to the preparation of alkyl-, cycloalkyl-, aryl- and aralkylpyrazines and provides certain alkyl-, cycloalkyl-, aryl- and aralkylpyrazines of novel structure.

Within recent years, various substituted pyrazine derivatives possessing strong odour and flavour characteristics have been isolated from naturally occurring materials. For example, the isolation of various alkylpyrazines from a coffee concentrate has been reported in Helv. Chem. Acta, vol. 50 (1967), pp. 694–705 and the isolation of 3-isobutyl-2-methoxypyrazine from bell peppers has been reported by Buttery et al. in Chem. and Ind., 1969, p. 490. Furthermore, 3-isopropyl-2-methoxypyrazine has been isolated from green peas as reported by Murray in Chem. and Ind., 1970, p. 897, and 3-sec-butyl-2-methoxypyrazine has been isolated from galbanun oil as reported by Bramwell et al., Tetrahedron letters, 1969, No. 37, p. 3215.

The extraction of these derivatives in a reasonable quantity is tedious and costly. The synthesis of these compounds and other members of the series of alkyl alkoxypyrazines which provide some potentially valuable chemicals for use in the perfumery and flavour industry has, up to now, been hindered by the lack of a generally convenient method for direct alkylation of the pyrazine nucleus.

It has been shown that side chain alkylation of an alkylpyrazine will occur if the alkylpyrazine is reacted with sodamide and an alkyl halide in the presence of liquefied ammonia (J. Org. Chem. 27(1), 1355 (1962)). Surprisingly, it has now been found that if pyrazines, alkylpyrazines, or certain other pyrazine derivatives are reacted with an aldehyde or ketone in the presence of sodium metal, then nuclear alkylation of the pyrazine will occur. Nuclear alkylation of an alkyl pyrazine or certain other pyrazine derivatives will also take place if other alkylating agents as defined later in this specification, are used. The presence of liquefied ammonia in this reaction is not essential. It represents one example of a range of solvents that can optionally be present in the reaction.

Accordingly, the present invention provides a process for the preparation of a pyrazine derivative of the general formula:

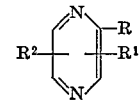
(I)

wherein

R represents hydrogen, a $C_1$–$C_{10}$ alkyl group, a $C_1$–$C_5$ alkoxy group or an amino group,
$R^1$ represents hydrogen, a $C_1$–$C_5$ alkoxy group, a $C_1$–$C_{10}$ alkyl group or $R^2$,
$R^2$ represents a $C_1$–$C_{10}$ alkyl group, a $C_5$–$C_{10}$ cycloalkyl group, a phenyl group, a $C_7$–$C_{11}$ aralkyl group or a $C_7$–$C_{11}$ alkaryl group comprising reacting a pyrazine compound of the general formula:

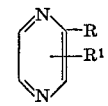
(II)

with an alkylating agent of the general formula $R^2X$, wherein

X represents —Cl, —Br, —I or the group >C=O, >C=NH or >C=N. Alk., the substituents on these groups together with the carbon atom of these groups forming a $C_1$–$C_{10}$ alkyl group, a $C_5$–$C_{10}$ cycloalkyl group, a $C_7$–$C_{11}$ aralkyl- or a $C_7$–$C_{11}$ alkaryl group, and
Alk. represents a $C_1$–$C_4$ alkyl group, in the presence of a source of available "free" electrons.

A source of available "free" electrons is defined as a source which can provide electrons, which, although solvated, can move freely in the above stated reaction system comprising a combination of pyrazine Compound II and alkylating agent. This source is preferably lithium, sodium or potassium metal which is present in the reaction system to an extent of 1–5 moles, preferably 1.0–2.5 moles per mole of pyrazine Compound II. Calcium, or an amalgam containing an equivalent amount of lithium, sodium, potassium or aluminium can alternatively be used.

The process of this invention enables the introduction of a $C_1$–$C_{10}$ alkyl group, a $C_5$–$C_{10}$ cycloalkyl group, a phenyl group, a $C_7$–$C_{11}$ aralkyl group or a $C_7$–$C_{11}$ alkaryl group into the nucleus of the pyrazine Compound II to be effected. With an excess of the alkylating agent and an excess of lithium, sodium or potassium metal based on the stoichiometric amount of pyrazine Compound II required for mono-alkylation, it is possible to insert two groups of this nature into the pyrazine nucleus.

The pyrazine Compound II is preferably pyrazine, a mono-$C_1$–$C_4$ alkylpyrazine, methoxypyrazine or an aminopyrazine. Pyrazine derivatives containing an amino-, a $C_1$–$C_{10}$ alkyl- or a $C_1$–$C_5$ alkoxy group and a further $C_1$–$C_{10}$ alkyl- or $C_1$–$C_5$ alkoxy substituent group are also further alkylated by the process of this invention.

In this specification, the term "alkylating agent," relates to a compound which under the specified reaction conditions is converted to a species which becomes attached to the pyrazine ring as a alkyl group, a cycloalkyl group, a phenyl group, an aralkyl group, an alkaryl group or a group which can further react to form an alkyl group, a cycloalkyl group or an aralkyl group.

The alkylating agent is preferably a dialkyl ketone containing up to ten carbon atoms, a $C_5$–$C_{10}$ cyclic ketone or an imino or $C_1$–$C_4$ alkylimino derivative of these compounds. Suitable specific ketones include acetone, butan-2-one, pentan-2-one, dimethyl heptan-4-one, octan-2-one, cyclopentanone, cyclohexanone or cyclodecanone. The use of these compounds or the alkyl-imino or imino derivatives of these compounds in the process of this invention leads to the formation of branched chain alkyl or cycloalkyl substituted pyrazines.

The alkylating agent can also be formaldehyde, an aldehyde containing a $C_1$–$C_9$ alkyl group, benzaldehyde, or an aldehyde containing a $C_7$–$C_{10}$ aralkyl or $C_7$–$C_{10}$ alkaryl group or an imino or $C_1$–$C_4$ alkyl imino derivative. Suitable specific aldehydes include paraformaldehyde, acetaldehyde, propionaldehyde, isobutan-1-al, hexan-1-al or decan-1-al. The use of a $C_1$–$C_9$ alkyl aldehyde or the imino or alkyl-imino derivatives thereof leads to the formation of linear alkyl substituted pyrazines. The use of benzaldehyde or phenylacetaldehyde or imino derivative thereof leads to the formation of an aralkyl substituted pyrazine.

The alkylating agent can also be a $C_2$–$C_{10}$ alkyl halide, a $C_5$–$C_{10}$ cycloalkyl halide, a phenyl halide, a $C_7$–$C_{11}$ aralkyl halide or a $C_7$–$C_{11}$ alkaryl halide, the term halide covering the groups chloride, bromide or iodide.

The process of this invention is preferably, although not necessarily, effected in the presence of one or more solvents which are substantially inert to the reactant materials. Examples of solvents which are of general application in this reaction include aromatic hydrocarbons such as benzene, toluene or xylene, $C_1$–$C_4$ alkyl ethers and primary, secondary or tertiary $C_1$–$C_4$ aliphatic amines. Liquefied ammonia and diethyl ether are particularly preferred solvents.

The reaction between the pyrazine Compound II and the alkylating agent can be carried out over a wide range of times and temperatures. If liquefied ammonia is used as a solvent, the reaction between the pyrazine Compound II and the alkylating agent is usually substantially completed within one hour. The yield of the alkylated pyrazine (I) can generally be increased by the addition of a strong base, such as an alkali metal methoxide, an alkali metal amide or an alkali metal hydroxide preferably in an amount of up to 0.50 molar based on the molar amount of alkylating agent present.

This invention further provides a pyrazine derivative of the general formula:

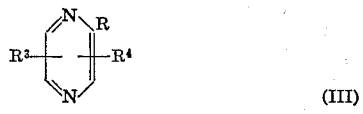

(III)

wherein $R^3$ represents a phenyl group, a $C_5$–$C_{10}$ cycloalkyl group or a $C_7$–$C_{11}$ aralkyl group, $R^4$ represents hydrogen, a $C_7$–$C_{11}$ aralkyl group or a $C_5$–$C_{10}$ cycloalkyl group and wherein R and $R^4$ both together do not represent hydrogen.

The pyrazine derivatives of the invention, mainly 2,6-disubstituted pyrazines together with a smaller proportion of the corresponding 2,5- and/or 2,3-disubstituted pyrazines and related trisubstituted pyrazines possess strong, characteristic odours. These compounds, particularly the alkoxy alkylpyrazines, are useful in imparting certain characteristic notes to perfume formulations. The dialkyl pyrazines and alkoxy alkylpyrazines are of value as flavouring agents for use in hazelnut, chocolate, coffee or paprika flavour compositions.

The invention will now be further described with reference to the following examples.

EXAMPLE I 23.5 g. 2-methylpyrazine (0.25 mole), 18 g. butan-2-one (0.25 mole), and 0.6 g. glass chippings were stirred together at room temperature over a period of 3 hours while 11.5 g. sodium (0.5 mole) was added in small pieces.

Stirring at room temperature was continued for a further 20 hours. The excess sodium was subsequently destroyed by addition of methanol and the reaction mixture was diluted with water.

The resultant aqueous solution was extracted with diethyl ether (3× 100 ml.). The ethereal extract was dried and the ether removed under reduced pressure to yield a crude product containing 11.2 g. sec.-butyl methylpyrazine (mainly 6-sec-butyl-2-methylpyrazine). Yield=30% theory.

Other pyrazine derivatives can be prepared by the process as described in this example. Table I sets out below certain exemplary combinations of pyrazine derivative (II) and ketone and the main reaction product which is obtained by reaction of these materials.

TABLE I

| Pyrazine compound (II) | Ketone | Main pyrazine reaction product (I) |
|---|---|---|
| Pyrazine | Acetone | 2-isopropyl-. |
| Do | Dimethylheptan-4-one | 2-4'-dimethylheptyl-. |
| 2-methyl- | Pentan-3-one | 2-methyl-6-(1'-ethylpropyl)-. |
| Do | Octan-2-one | 2-methyl-6-(1'-methylheptyl)-. |
| 2-isopropyl- | Butan-2-one | 6-sec-butyl-2-isopropyl. |
| Do | Octan-2-one | 6,-(1'-methylheptyl)-2-isopropyl-. |
| 2-n hexyl- | Pentan-3-one | 2-n hexyl-6-(1'-ethylpropyl)-. |
| 2-n octyl- | Acetone | 2-n octyl-6-isopropyl-. |
| 2-n decyl- | Butan-2-one | 6-sec-butyl-2-n decyl-. |
| 2,3-dimethyl | do | 6-sec-butyl-2, 3-dimethyl-. |

EXAMPLE II 18.8 g. 2-methylpyrazine (0.2 mole) and 14.4 g. butan-2-one (0.2 mole) were added to 100 ml. diethyl ether, 9.2 g. sodium metal (0.4 mole), and 0.6 g. glass chippings over a period of 10 minutes. This reaction mixture was stirred for an additional 20 hours at room temperature and the unreacted sodium subsequently destroyed by the addition of methanol.

The reaction mixture was diluted with a large volume of water and the crude reaction product was extracted by the addition of diethyl ether (3× 100 ml.). The ethereal extract was dried and the diethyl ether removed under reduced pressure. Analysis of the crude material by G.L.C. using cumene as an internal standard showed it to contain 21 g. sec-butyl methylpyrazine (mainly 6-sec-butyl-2-methylpyrazine). Yield=70% theory.

EXAMPLE III 23.5 g. 2-methylpyrazine (0.25 mole), 18 g. 2-methyl-propan-1-al (0.25 mole), 100 ml. toluene, and 0.6 g. glass chippings were stirred together and 11.5 g. sodium (0.5 mole) was added in small pieces over a period of 2 hours. This reaction mixture was stirred for a further 20 hours when the unreacted sodium was destroyed by the addition of methanol.

The reaction mixture was subsequently diluted with a large volume of water. An organic layer separated and was removed. The residual aqueous phase was extracted with diethyl ether (3× 100 ml.) and the ethereal extract bulked with the organic layer. The diethyl ether was removed under reduced pressure and analysis of the crude material by G.L.C. using cumene as an internal standard showed it to contain 3.2 g. iso-butyl methylpyrazine (mainly 6-iso-butyl - 2 - methylpyrazine). Yield=7.5% theory.

EXAMPLE IV 46 g. sodium (2 moles) were dissolved in 600 ml. liquefied ammonia. 188 g. 2-methylpyrazine (2 moles) was added to this solution over a period of 10 minutes, followed by the addition of 168 g. cyclopentanone (2 moles) during 20 minutes. This reaction mixture was stirred for a further hour and subsequently neutralised by the addition of 112 g. ammonium chloride (2 moles).

The liquefied ammonia was allowed to evaporate overnight and the residue was taken up in 600 ml. water and 100 ml. conc. hydrochloric acid. This solution was subsequently washed with diethyl ether and then made strongly basic with solid potassium carbonate. The basic solution was extracted with diethyl ether. The etheral extract was dried and distilled to give a 25% yield of mainly 2-methyl-6-cyclopentylpyrazine. This material had $n_D^{20}=1.5231$, B.P.=106°–107° C./10 mm. and contained about 2% of the 2,3-isomer.

Other pyrazine derivatives can be prepared by the process as described in this example. Table II sets out below certain exemplary combinations of pyrazine derivative (II) and ketone and the main reaction product which is obtained by reaction of these materials.

TABLE II

| Pyrazine compound (II) | Ketone | Main pyrazine reaction product (I) |
|---|---|---|
| 2-isopropyl- | Cyclopentanone | 6-cyclopentyl-2-isopropyl-. |
| 2-methyl- | Cyclohexanone | 6-cyclohexyl-2-methyl-. |
| 2-isopropyl- | do | 6-cyclohexyl-2-isopropyl-. |
| 2-methyl- | Cyclodecanone | 6-cyclodecyl-2-methyl-. |
| 2-isopropyl | do | 6-cyclodecyl-2-isopropyl-. |
| 2-tert-butyl | do | 2-tert-butyl-6-cyclodecyl-. |

EXAMPLE V 94 g. 2-methylpyrazine (1 mole) and 44 g. redistilled actaldehyde (1 mole) was run into a solution of 46 g. sodium (2 mole) in 600 ml. liquefied ammonia over a period of 30 minutes.

After stirring the reaction mixture for a further 30 minutes, the reaction was quenched by the addition of 112 g. ammonia chloride (2 moles). The ammonia was evaporated and the residue taken up in 300 ml. water. The aqueous solution was made strongly alkaline, by adding 25 ml. of aqueous 50% w./v. sodium hydroxide solution and extracted with diethyl ether. The organic extract was dried and subsequently distilled to give a 15% yield of ethyl methylpyrazine (mainly 6-ethyl-2-methylpyrazine). This material had $n_D^{20}=1.4989$ and B.P.=90° C./50 mm.

Other pyrazine derivatives can be prepared by the process as described in this example. Table III sets out below certain exemplary combinations of pyrazine derivative (II) and aldehyde and the main reaciton product which is obtained by reaction of these materials.

TABLE III

| Pyrazine compound (II) | Aldehyde | Main pyrazine reaction product (I) |
|---|---|---|
| 2-methyl | Benzaldehyde | 2-methyl-6-phenylmethyl-. |
| Do | Hexan-1-al | 6-hexyl-2-methyl-. |
| Do | Octan-1-al | 2-methyl-6-octyl-. |
| 2-isopropyl | Butan-1-al | 6-butyl-2-isopropyl-. |
| 2-n hexyl- | Acetaldehyde | 6-ethyl-2-n hexyl-. |
| 2-n-decyl- | Butan-1-al | 6-butyl-2-n-decyl-. |
| 2,3-dimethyl- | Propan-1-al | 2,3-dimethyl-6-propyl-. |
| 2,5-dimethyl- | do | 2,5-dimethyl-6-propyl-. |

EXAMPLE VI 94 g. 2-methylpyrazine (1 mole) and 72 g. butan-2-one (1 mole) was dissolved in 600 ml. liquefied ammonia.

46 g. sodium metal (2 moles) was added in small pieces to the reaction solution over a period of 50 minutes. After stirring for a further 30 minutes, the reaction mixture was worked up by the method as described in Example V to give a 38% yield of sec. butyl methylpyrazine of which 97% was the 2,6-isomer. This material had $n_D^{20}=1.4890$ and B.P.=104° C./40 mm.

EXAMPLE VII 94 g. methylpyrazine (1 mole) and 72 g. butan-2-one (1 mole) was dissolved in 600 ml. liquefied ammonia.

14 g. lithium metal (2 moles) was added to this reaction mixture over a period of 50 minutes. After stirring for a further 30 minutes the reaction mixture was worked up as in Example V to give 6-sec.-butyl-2-methylpyrazine in 15% yield. An equivalent amount of the intermediate hydroxy compound, 1-methyl-1-(6'-methylpyrazinyl)-propan-1-ol was formed simultaneously.

On repeating this experiment with 78 g. potassium instead of 14 g. lithium a 65% yield of 6-sec.-butyl-2-methylpyrazine was obtained. Similarly, 2-methylpyrazine was treated with iso-butan-1-al in the presence of potassium to give a 28% yield of 6-isobutyl-2-methylpyrazine.

EXAMPLE VIII 18.8 g. 2-methylpyrazine (0.2 mole) was added to a solution of 4.6 g. sodium (0.2 mole) in 250 ml. liquefied ammonia. A solution of 17.0 g. 2-iodopropane (0.1 mole) in 25 ml. diethyl ether was added to the reaction mixture which was kept at a temperature of —50° C., over a period of 18 minutes. After stirring for a further period of 45 minutes the reaction mixture was quenched by the addition of 0.88 ammonia solution (25 ml.).

The ammonia was allowed to evaporate and the residue taken up in 100 ml. water. The aqueous solution thus formed was extracted with diethyl ether. The organic extract was dried and subsequently distilled to yield a crude reaction product containing isopropyl methylpyrazine (4.9 g.). The ratio of 6-methyl-2-isopropylpyrazine to its 2,3-isomer was 3:1. This material had $n_D^{20}=1.4909$ and B.P.=96° C./50 mm.

Other pyrazine derivatives can be prepared by the process as described in this example. Table IV sets out below certain exemplary combinations of pyrazine derivative (II) and alkyl halide and the main reaction product which is obtained by reaction of these materials.

TABLE IV

| Pyrazine compound (II) | Alkyl halide | Main pyrazine reaction product (I) |
|---|---|---|
| Pyrazine | Ethyl iodide | 2-ethyl-. |
| 2-methyl | Benzyl chloride | 6-benzyl-2-methyl-. |
| 2-ethyl | n-Butyl bromide | 6-n-butyl-2-methyl-. |
| 2-tert-butyl- | Iodo benzene | 2-tert-butyl-6-phenyl-. |

EXAMPLE IX 23.75 g. 2-aminopyrazine (0.25 mole) was dissolved in 500 ml. liquefied ammonia. To this solution was added 11.5 g. sodium metal (0.50 mole) and 9.75 g. sodamide (0.25 mole). 18.0 g. butan-2-one (0.25 mole) was slowly added to this reaction mixture over a period of 30 minutes.

After stirring for an additional 30 minutes the reaction mixture was worked up by the method described in Example V. The ethereal layer yielded a solid product which was recrytallised from ethanol and from cyclohexane and was identified as 2-amino-6-sec.-butylpyrazine. Yield=12.3 g. (32%) of a solid having a melting point 90°–91.5° C.

This experiment was repeated with iso-butyraldehyde instead of butan-2-one and a 16% yield of 2-amino-6-isobutylpyrazine was obtained.

EXAMPLE X 2.3 g. 2-methoxypyrazine (0.02 mole) was dissolved in 100 ml. liquefied ammonia. To this solution was added 1.1 g. sodium (0.05 mole), 0.75 g. sodamide (0.02 mole) and 1.5 g. butan-2-one.

This reaction mixture was stirred for 45 minutes at room temperature and then worked up by the method as described in Example V. A 20% yield of 2-sec.-butyl-6-methoxypyrazine was obtained.

Other pyrazine derivatives can be prepared by the process as described in this example. Table V sets out below certain exemplary combinations of pyrazine derivative (II) and ketone and the main reaction product which is obtained by reaction of these materials.

TABLE V

| Pyrazine compound (II) | Ketone | Main pyrazine reaction product (I) |
| --- | --- | --- |
| 2-methoxy | Octan-2-one | 2-methoxy-6-(1′methylheptyl)- |
| 2-ethoxy | Acetone | 2-ethoxy-6-isopropyl- |
| Do | Octan-2-one | 2-ethoxy-6-(1′methylheptyl)- |
| 2-n butoxy | Pentan-3-one | 2-n butoxy-6-(1′ethylpropyl)- |

EXAMPLE XI 23.5 g. 2-methylpyrazine (0.25 mole) was dissolved in 250 ml. liquefied ammonia. To this solution was added 11.5 g. sodium (0.50 mole) and then 15.5 g. N-ethyl isobutylideneimine (0.155 mole) over a period of 2 hours.

This reaction mixture was stirred for a further 30 minutes before working up by the method as described in Example V. To give 1.7 g. 6-isobutyl-2-methylpyrazine (7.5%).

The N-ethyl isobutylideneimine was prepared by the method of Campbell et al., J.A.C.S. 1944, 66, p. 82.

EXAMPLE XII 94 g. 2-methylpyrazine (1.0 mole) and 58 g. acetone (1.0 mole) was dissolved in 600 ml. liquefied ammonia. To this solution was added 40 g. calcium metal (1.0 mole).

This reaction mixture was stirred for 2 hours and consequently worked up by the method as described in Example V. A very thick product was formed which proved difficult to ether extract. The solid product was filtered off and the mother liquor ether extracted to yield 1.1 g. 6-methyl-2-isopropylpyrazine. Yield=about 1%.

EXAMPLE XIII 9.2 g. sodium metal (0.4 mole) and 2 drops mercury metal was added to 100 ml. toluene. This mixture was stirred at reflux temperature (110° C.) to form the amalgam.

18.8 g. 2-methylpyrazine (0.2 mole) and 14.4 g. butan-2-one (0.2 mole) were added to the mixture of toluene and sodium amalgum over a period of 30 minutes. The reaction mixture thus formed was subsequently stirred at room temperature for a further 4 hours. The reaction mixture was subsequently worked up by a method as described in Example V.

G.L.C. showed that a yield of 8.0 g. 6-sec.butyl-2-methylpyrazine (27%) had been obtained.

EXAMPLE XIV 27.4 g. butan-2-one (0.38 mole) and 31.3 g. 2-methylpyrazine (0.33 mole) were warmed together with 3.4 g. aluminium amalgam on a water bath until reaction occurred. The reaction mixture was subsequently refluxed for 4 hours and subsequently decomposed by the addition of 80 mls. 20% aqueous sodium hydroxide solution.

The reaction mixture was worked up by the method as described in Example V and G.L.C. showed that 1.5 g. 6-sec.butyl-2-methylpyrazine (3%) had been obtained.

EXAMPLE XV

A solution comprising 4.0 g. pyrazine (0.05 mole), 3.6 g. butan-2-one (0.05 mole) and 8 ml. diethyl ether was added to a refluxing solution of 100 ml. liquefied ammonia and 2.3 g. sodium (0.1 mole) and 1.95 g. sodamide (0.05 mole) over a period of 10 minutes. After stirring this reaction mixture for 30 minutes, 5 ml. aqueous ammonia solution (S.G. 0.88) was added.

The ammonia was evaporated from the reaction system and the residue was taken up in 50 ml. water. This aqueous solution was extracted with diethyl ether and G.L.C. showed the presence of sec.butylpyrazine (4.0 g., 59% theory).

What is claimed is:

1. A process for the introduction of a hydrocarbon substituent having from 2 to 10 carbon atoms directly into the ring of a pyrazine compound of the formula

wherein R and $R^1$ are each selected from the class consisting of hydrogen, an alkyl radical having from 1 to 10 carbon atoms, an alkoxy radical having from 1 to 5 carbon atoms and an amino radical which comprises reacting the said pyrazine compound with an alkylating agent selected from the class consisting of an aldehyde having from 2 to 10 carbon atoms, a ketone having from 3 to 10 carbon atoms, a phenyl halide and an alkyl halide having from 2 to 10 carbon atoms, the halide radical being selected from the class consisting of chloride bromide and iodide radicals, in the presence of a metal selected from the group consisting of lithium, sodium and potassium.

2. The process according to claim 1, in which from 1 to 5 moles of the said metal are used per mole of pyrazine compound.

3. The process according to claim 2, in which the metal is applied as an amalgam.

4. The process according to claim 1, which is effected in the presence of an inert solvent.

5. The process according to claim 1, which is effected in the presence of a strong base selected from the class consisting of an alkali metal hydroxide, an alkali metal methoxide and an alkali metal amide in an amount of up to 0.50 molar based on the molar amount of alkylating agent present.

References Cited

UNITED STATES PATENTS 3,453,278   7/1969   Ellis _____ 260—250 R

NICHOLAS S. RIZZO, Primary Examiner